Patented Nov. 1, 1938

2,135,293

UNITED STATES PATENT OFFICE 2,135,293

MEDICINAL AZO DYES

Raemer R. Renshaw, New York, and Edmond T. Tisza, Yonkers, N. Y., assignors to Pyridium Corporation, a corporation of New York No Drawing. Application August 20, 1936,
Serial No. 96,966

10 Claims. (Cl. 260—156)

This invention relates to improvements in preparing water soluble azo dyes of the pyridine series for medical uses and the method of preparing them.

Azo dyes of the phenyl azo diamino pyridine group have been found to be useful in the practice of medicine on account of their bactericidal properties. Usually, they are administered orally, in which case they are eliminated through the urinary tract. While they have been used locally to a certain extent, this use is limited on account of their slight solubility in water. An object of this invention is to overcome this by increasing their solubility.

We have found that the solubility of the azo dyes of this group is greatly increased when they are alkylated on the pyridine nitrogen, that is, they are changed into quaternary pyridinium bases.

There are two methods to prepare the dyes of this new series. Either the original dye is treated with an alkyl halide, an alkyl sulphate, or other alkylating agents, or the acetamino pyridines are alkylated, the acetyl groups being hydrolized off and coupled with a diazotized arylamine.

The general structural formula of the dyes according to this invention, is the following:

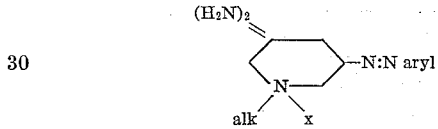

in which aryl represents a six membered ring, such as benzene or pyridine, which may be substituted or unsubstituted; alk represents an alkyl group and $x$ represents a halogen or methyl sulphuric acid or other anions.

These medicinal dyes are also in general deeper colored when dissolved than the corresponding unalkylated dyes. They are comparatively less toxic. When taken internally they eliminate through the urinary tract and the color of the urine containing the elimination is orange to red colored.

Normally, their bactericidal properties are practically the same as that of the original dye, while in some cases the bactericidal action is increased.

As examples of their specific preparation the following is given:

*Example 1.*—10.6 gms. phenylazo-2-6-diaminopyridine is dissolved in 500 cc. hot carbontetrachloride and then 6.3 gms. methylsulphate is added, the mixture being then refluxed for eleven hours. A precipitate begins to form during the first hour and the reaction is completed in the stated time. After cooling the precipitate is collected on a filter, washed with hot acetone to remove any unchanged dye, and recrystallized out of hot methanol.

The melting point of the final product is 242° C. and its formula is the following:

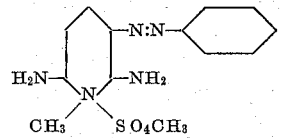

This is: Phenylazo 2-6 diamino methyl pyridinium methyl sulphate.

*Example 2.*—2.7 gms. p-tolylazo 2-6-diamino 4 picolin, 0.8 cc. methyliodide and 6 cc. ethanol are heated in a sealed pressure bottle for six hours in a boiling water bath. After cooling, the formed precipitate is collected and is then dissolved in about 400 cc. hot water and after cooling, freshly prepared silver chloride is added while stirring. After an hour of stirring the formed silver iodide is filtered off and the filtrate evaporated to dryness and recrystallized out of absolute ethanol. The brownish yellow product melts at 246–7° C. and has the following formula:

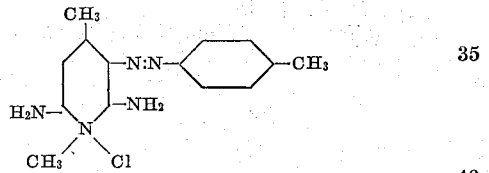

This is: p-tolylazo-2-6 diamino methyl-γ picolinium chloride.

The following dyes were prepared in a similar way:

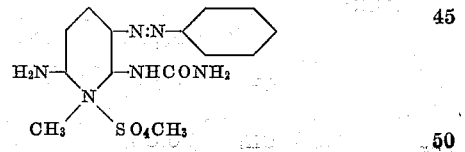

This is: phenylazo 2 urea-6 amino-methyl pyridiniummethyl sulphate.

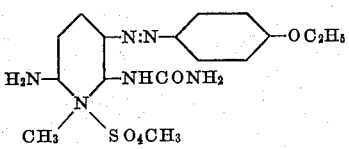

This is: ethoxy phenylazo-2 urea-6 amino-methyl pyridinium methylsulphate.

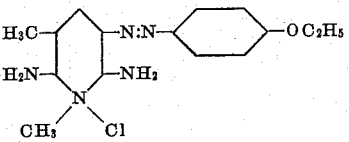

This is: p-ethoxyphenylazo-2-6 diamino-3 picoliniummethylchloride.

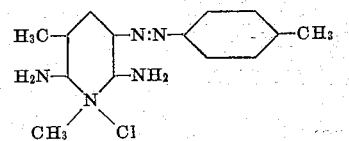

This is: p-tolylazo-2-6 diamino 3 picolinium methyl chloride.

As already mentioned, these N-alkylated dyes may be prepared also by coupling the diazotised aryl amines with diaminoalkylpyridinium salts. Diacetyl-diaminopyridine is alkylated for this purpose with methyl sulphate in nitrobenzene solution. The white, crystalline substance diacetyldiaminomethylpyridiniummethylsulphate melts at 129–130° C. and its formula is:

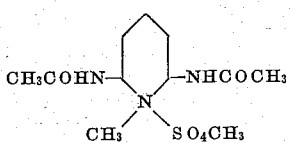

Immediately before copulation the acetyl groups are hydrolized off.

*Example 3.*—1.0 gm. diacetyl diaminomethylpyridiniummethylsulphate is dissolved in 7 cc. water and 1 cc. conc. hydrochloric acid and boiled for twenty minutes.

While this hydrolyzation takes place a diazonium salt solution is prepared out of 0.33 gms. p-toluidine in the usual way. Then the first solution is cooled down and added to the diazonium salt solution. A red color appears gradually. The mixture is kept over night and next day the crystals are collected on a filter. The crystals are dissolved in hot water, sodium chloride is added and after cooling filtering takes place. The yellow crystals are, if desired, repeatedly recrystallized out of hot water. Their melting point is 248–9° C.

The formula of the obtained substance is:

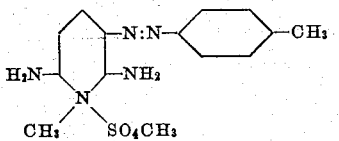

This is: tolylazo 2-6 diamino-methylpyridiniummethylsulphate.

The following dyes are prepared in a similar way:

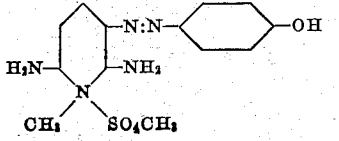

This is: p-hydroxyphenylazo-2-6 diamino-methylpyridiniummethylsulphate.

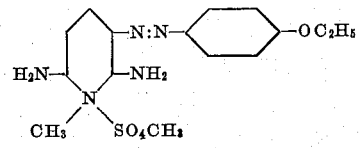

This is: p-ethoxyphenylazo-2-6 diamino methylpyridiniummethylsulphate.

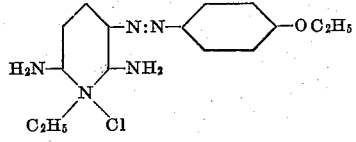

This is: p-ethoxy phenylazo-2-6 diaminoethylpyridiniumchloride.

These N-alkylated dyes are very valuable medicinal compounds. They are relatively non-toxic when administered internally and being eliminated through the urinary tract, they may be used as urinary antiseptics. They are relatively much more soluble than the unalkylated dyes. They are also useful for local application in form of ointments, and in aqueous solutions, as wet dressings, irrigations and the like. Their bactericidal power against the cocci group is generally found to be more pronounced than against the coli group.

The statements as regards to formulas and structure are theoretical and are not intended as limitations. As many other N-alkylated azo pyridines can be made, which are apparently widely different embodiments of this invention, without departing from the spirit thereof we do not intend to limit ourselves to the specific embodiments or examples herein disclosed.

What we claim is:

1. As a medicinal substance, an N-alkylated azo compound of the formula

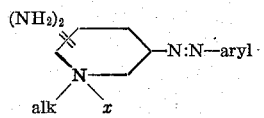

in which aryl represents a phenyl radical, alk represents an alkyl group, and $x$ represents a halogen.

2. As a medicinal substance, an N-alkylated azo compound of the formula

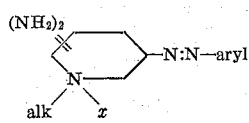

in which aryl represents a phenyl radical, alk represents an alkyl group, and $x$ represents methyl-sulphuric acid.

3. As a medicinal substance, an N-alkylated azo compound of the formula

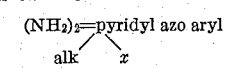

in which aryl represents an aromatic six membered ring, alk represents an alkyl group and $x$ is an anion, alk and $x$ being directly linked to the pyridine nitrogen.

4. As a medicinal substance, an N-alkylated azo compound of the structural formula

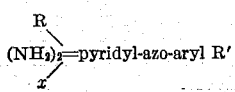

in which aryl represents an aromatic six membered ring, R represents an alkyl group, $x$ represents an anion, R and $x$ being directly linked to the pyridine nitrogen and R' is a member of a group consisting of a hydrogen atom, alkyl, hydroxy and alkoxy.

5. The medicinal substance according to claim 4 having aryl representing a phenyl radical.

6. As a medicinal substance, an N-alkylated azo compound of the structural formula

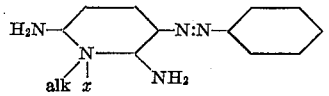

in which alk represents an alkyl group, $x$ represents an anion.

7. As a medicinal substance, an N-alkylated azo compound of the structural formula

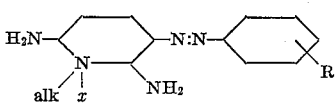

in which alk represents an alkyl group, $x$ represents an anion, and R represents an alkyl group.

8. As a medicinal substance, an N-alkylated azo compound of the structural formula

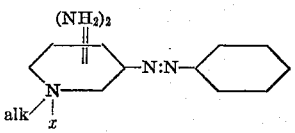

in which alk represents an alkyl group, $x$ represents an anion.

9. As a medicinal substance, an N-alkylated azo compound of the structural formula

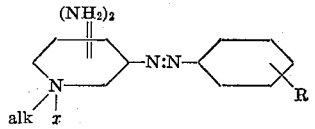

in which alk represents an alkyl group, $x$ represents an anion, and R represents an alkyl group.

10. As a new substance, a dye of the phenyl azo diamino pyridine group having an alkyl group and an anion directly attached to the pyridine nitrogen.

RAEMER R. RENSHAW.
EDMOND T. TISZA.